UNITED STATES PATENT OFFICE.

ALBERT H. STONE, OF BOSTON, MASSACHUSETTS.

PROCESS OF MAKING A DEPILATORY FOR HIDES AND SKINS.

1,394,588. Specification of Letters Patent. Patented Oct. 25, 1921.

No Drawing. Application filed May 23, 1919. Serial No. 299,243.

*To all whom it may concern:*

Be it known that I, ALBERT H. STONE, a citizen of the United States, residing at Boston, in the county of Suffolk and State of Massachusetts, have invented a certain new and useful Process of Making a Depilatory for Hides and Skins, of which the following is a specification.

Lime and sodium sulfid react and produce a good depilatory for hides and skins of all kinds.

The present invention is an improved method or step in the method for obtaining the depilatory in solid form and for using not only quick lime but also air slaked lime or hydrated lime and sodium sulfid liquor, hot or cold.

According to the present invention sodium sulfid liquor hot or cold, and lime unslaked or hydrated or slaked in the air, in the proportion of three parts sulfid liquor to one part lime are put into a mixing machine that can be closed to the atmosphere. An example of a mixing machine is an oblong drum provided with an opening or openings having lids, and a movable stirrer arranged in the drum. The lime, dry, is put into the machine in the form of powder or of small lumps. The sulfid liquor is run into the mixer as by means of a hose and while the mixer is open a chemical reaction, probably double decomposition, with slaking in the case of unslaked lime, takes place and the contents of the drum become hot due to slaking or otherwise. Upon the completion of the reaction or upon the completion of its more violent manifestations, the drum may be closed, and the mixer is operated until a creamy or muddy consistency is obtained, for example, for two or three hours. The contents of the drum are then run out into barrels or cooling pans and when cool it is solid, but can be easily crushed into powder, and this solid or powdered substance or depilatory is readily soluble in water. Sodium sulfid liquor is sometimes called hydrated sulfid of sodium and it is sulfid of sodium containing polysulfids of sodium. Sulfid of sodium containing polysulfids of sodium, or sulfid liquor may be obtained from sulfur and sulfid of sodium by the application of heat or boiling or from black ash in the manufacture of sulfid of sodium and prior to the usual evaporation or dehydration.

The prolonged agitation of the result or product of the described reaction is a simple and inexpensive way of imparting the quality of solidification, and this is important for a solid product is desirable for transportation and shipment. Again the continued agitation affords latitude in the use of the ingredients for example, the condition of the lime whether unslaked, hydrated or air slaked is not important, nor is the temperature of the sodium sulfid liquor. For these and other reasons that will be understood by those skilled in the art the prolonged agitation, which ultimately produces solidification and affords latitude in the character of the raw materials used, is an important and meritorious step or improvement in the preparation of the class of depilatories to which the invention relates.

One explanation of the production of a solid product from even reasonably varying raw materials by prolonged and violent mechanical agitation at the described stage of the process is that all the constituents are chemically combined and are not permitted to remain dead or dormant.

I claim:

1. In the process of making a depilatory from lime and sodium sulfid liquor the improved step which consists in a prolonged agitation while hot of the result or product of the reaction of said ingredients, whereby the depilatory is obtained in solid form and latitude in the character of the ingredients used is afforded.

2. In the process of making a depilatory from lime and sodium sulfid liquor the improved step which consists in a prolonged agitation while hot in a closed vessel of the result or product of the reaction of said ingredients and in its solidification by cooling in the air, substantially as described.

ALBERT H. STONE.